United States Patent
Schantl

(10) Patent No.: US 11,912,118 B2
(45) Date of Patent: Feb. 27, 2024

(54) UNIT MOUNTING

(71) Applicant: AUDI AG, Ingolstadt (DE)

(72) Inventor: Gilbert Schantl, Munich (DE)

(73) Assignee: AUDI AG, Ingolstadt (DE)

( * ) Notice: Subject to any disclaimer, the term of this patent is extended or adjusted under 35 U.S.C. 154(b) by 409 days.

(21) Appl. No.: 17/286,050

(22) PCT Filed: Nov. 7, 2019

(86) PCT No.: PCT/EP2019/080548
§ 371 (c)(1),
(2) Date: Apr. 16, 2021

(87) PCT Pub. No.: WO2020/108946
PCT Pub. Date: Jun. 4, 2020

(65) Prior Publication Data
US 2021/0379976 A1  Dec. 9, 2021

(30) Foreign Application Priority Data
Nov. 30, 2018  (DE) ..................... 10 2018 220 728.3

(51) Int. Cl.
*B60K 1/00* (2006.01)
*B62D 21/11* (2006.01)
*B62D 25/08* (2006.01)

(52) U.S. Cl.
CPC ................ *B60K 1/00* (2013.01); *B62D 21/11* (2013.01); *B62D 25/082* (2013.01)

(58) Field of Classification Search
CPC ........ B60K 1/00; B62D 21/11; B62D 25/082; B62D 25/08; B62D 25/085
See application file for complete search history.

(56) References Cited

U.S. PATENT DOCUMENTS

| | | | |
|---|---|---|---|
| 7,108,098 B2 * | 9/2006 | Reese | B62D 21/11 180/291 |
| 10,071,772 B2 * | 9/2018 | Sasaki | B62D 21/11 |
| 10,953,738 B2 * | 3/2021 | Hamel | F16M 13/02 |
| 2017/0057550 A1 | 3/2017 | Sasaki | |
| 2017/0184192 A1 | 6/2017 | Eriksson | |

FOREIGN PATENT DOCUMENTS

| | | | |
|---|---|---|---|
| CN | 106697054 A | 5/2017 | |
| DE | 4128113 A1 | 2/1993 | |
| DE | 102009040896 A1 * | 3/2011 | ............... B60K 1/00 |
| DE | 102009040896 A1 | 3/2011 | |

(Continued)

OTHER PUBLICATIONS

Mechanical translation of DE102009040896, Mar. 2011.*

(Continued)

*Primary Examiner* — John D Walters
(74) *Attorney, Agent, or Firm* — Maier & Maier, PLLC

(57) ABSTRACT

A unit mounting for a drive unit of an electrical motor vehicle, including at least one first unit bearing and one second unit bearing which are arranged spaced apart from one another in the vehicle transverse direction on an auxiliary frame. The unit bearings each support the drive unit via a unit support. The first unit bearing and the second unit bearing are arranged asymmetrically in relation to one another on a crossbeam of the auxiliary frame.

20 Claims, 3 Drawing Sheets

(56) References Cited

FOREIGN PATENT DOCUMENTS

| DE | 1102010014574 A1 | 10/2011 |
| DE | 102012012327 A1 | 12/2013 |
| DE | 102012221193 A1 | 5/2014 |
| DE | 102014118360 A1 | 6/2016 |
| DE | 102015016390 A1 | 6/2017 |
| EP | 2675694 B1 | 6/2016 |
| EP | 3369645 A1 | 9/2018 |
| EP | 3539808 A1 | 9/2019 |

OTHER PUBLICATIONS

Notification of Transmittal of Translation of the International Preliminary Report on Patentability dated Jun. 10, 2021 in International Application No. PCT/EP2019/080548; 11 pages.
German Examination Report dated Nov. 14, 2019 in corresponding German Application No. 10 2018 220 728.3; 16 pages; Machine translation attached.
International Search Report (with English translation) and Written Opinion (with Machine translation) dated Mar. 6, 2020 in corresponding International Application No. PCT/EP2019/080548; 19 pages.

* cited by examiner

UNIT MOUNTING

FIELD

The invention relates to a unit mounting for a drive unit of an electrical motor vehicle.

BACKGROUND

The drive unit of an electrical vehicle is typically arranged in the region of one or more axles, between the drive wheels, and is mounted via vibration-damping unit bearings and unit supports, which sometimes have material-intensive supporting arms extending over long lever arm lengths, on a supporting structure of the vehicle body. In particular, the drive unit can be supported on an auxiliary frame, which forms the connection between the drive unit and the vehicle body.

There is fundamentally a conflict of goals in unit mountings in the unit mounting matching with respect to vibrations and structure-borne noise introduction into the vehicle body. Vibrations are reduced by the most rigid possible bearings, while in contrast structure-borne noise introduction is reduced by soft bearings.

Because of the design, three points on the drive unit are suitable for the attachment of the drive unit, because of which the drive unit is generally mounted by means of a statically defined three-point mounting. One problem of the three-point mounting is that only a low level of damping is achievable for the drive unit due to the few bearing points, which results in comfort losses that increase vibrations.

To achieve a higher level of damping, the drive unit can also be supported in a four-point mounting, for example via two front and two rear unit bearings. A four-point mounting enables a higher level of comfort in the chassis and better acoustic insulation of the motor-transmission unit in the case of increasing motor power and high torques linked thereto, since each bearing carries a lower load. Three rigid structures result due to the structural design of the drive unit, which are suitable as unit-side attachment points because of their proximity to the auxiliary frame. The fourth attachment point has to be reinforced via a longer unit-side support, however, which results in an increase of the weight.

An arrangement of an electric motor unit in a vehicle is known from DE 10 2012 012 327 A1. The electric motor unit is fastened via at least two unit girders on the vehicle body and on an axle girder. The unit bearings fastened on the axle girder side are attached via motor supports on the drive unit (or electric motor unit). One of the unit bearings is fastened on the motor cover/housing of the electric motor unit, while the other unit bearing is fastened on a transmission housing.

A unit mounting in which an electric motor is supported via a four-point mounting on the auxiliary frame is known from DE 10 2015 016 390 A1. For this purpose, front unit bearings are formed on the front node elements of the auxiliary frame and rear unit bearings are formed on the rear node element, which are each screwed together with unit supports.

SUMMARY

The invention is based on the object of refining a unit mounting into such a way that a weight-saving optimization of the attachment of the drive unit is achieved.

In a known way, a unit mounting for a drive unit of an electrical motor vehicle comprises at least one first unit bearing and one second unit bearing, wherein the unit bearings are arranged spaced apart from one another in the vehicle transverse direction on an auxiliary frame and the unit bearings each support the drive unit via a unit support.

The drive unit is designed, for example, as an electrical machine, comprising an electric motor, a transmission, and a differential. For vibration damping, the drive unit is supported via damping unit bearings on the auxiliary frame with unit supports interconnected. At least one first and one second unit bearing are arranged spaced apart from one another in the vehicle transverse direction on the auxiliary frame, wherein the auxiliary frame has two longitudinal girders arranged laterally in the vehicle longitudinal direction, which are each connected to one another via a crossbeam at their front and rear node elements. The auxiliary frame is used as a connection between the drive unit and the vehicle body.

Because of the design, the drive unit has two suitable attachment points on the housing of the transmission, which are each located in the immediate vicinity of one crossbeam of the auxiliary frame depending on the embodiment of the drive unit and the arrangement of electric motor and differential in relation to one another. The attachment points on the transmission housing are each supported on the auxiliary frame via a first unit bearing and a second unit bearing, spaced apart thereto in the vehicle transverse direction.

The housing of the differential and the housing of the electric motor are each arranged on the other crossbeam. Both have a suitable attachment point because of the design, wherein the housing of the differential is supported on the auxiliary frame close to the auxiliary frame via a first unit bearing, and the housing of the electric motor is supported on the auxiliary frame via a second unit bearing spaced apart in the vehicle transverse direction from the first unit bearing. The attachment point on the housing of the differential is arranged close to the auxiliary frame on the first unit bearing, whereas the attachment point of the motor housing has a greater distance from the auxiliary frame. The second unit bearing conventionally supports the drive unit, in particular the electric motor, in a vibration-rigid manner on the auxiliary frame with a material-intensive unit support interconnected.

According to the invention, the first unit bearing and the second unit bearing are arranged asymmetrically in relation to one another on a crossbeam of the auxiliary frame. Depending on the embodiment of the electric motor and depending on the arrangement of motor and differential in relation to one another, the asymmetry of the first and the second unit bearing can be formed either on the front or on the rear crossbeam. In particular, the second unit bearing, independently of asymmetrical arrangement relative to the first unit bearing, is arranged on the auxiliary frame in such a way that it has the shortest possible distance to the respective drive-side attachment point to be supported. In this way, a material-intensive reinforcement of the respective attachment point, for example via a unit support formed having longer lever arms, which causes an increase of the weight at the bearing point, is advantageously avoidable.

According to one preferred embodiment, the asymmetrical first and second unit bearings are arranged on the front crossbeam of the auxiliary frame in the vehicle longitudinal direction. Depending on the embodiment of the electric motor and depending on the arrangement of motor and differential in relation to one another, the electric motor and the differential are arranged on the front crossbeam of the auxiliary frame, wherein the attachment point of the differential is arranged, in contrast to the attachment point of the motor, close to the auxiliary frame on the front crossbeam. The second unit bearing is arranged asymmetrically to the first unit bearing on the auxiliary frame. In this way, the second unit bearing has the shortest possible distance to the respective drive-side attachment point to be supported on the motor housing. A material-intensive reinforcement of the respective attachment point, for example via a unit support formed having longer lever arms, which causes an increase of the weight at the bearing point, is advantageously avoidable.

According to an alternative embodiment, the asymmetrical first and second unit bearings are arranged on the rear crossbeam of the auxiliary frame in the vehicle longitudinal direction. Depending on the embodiment of the electric motor and depending on the arrangement of motor and differential in relation to one another, the electric motor and the differential are arranged on the rear crossbeam of the auxiliary frame, wherein the attachment point of the differential is arranged, in contrast to the attachment point of the rotor, close to the auxiliary frame on the rear crossbeam. The asymmetrical arrangement of the second unit bearing relative to the first unit bearing enables a short distance between the second unit bearing and the respective drive-side attachment point on the motor housing to be supported. A material-intensive reinforcement of the respective attachment point, for example via a unit support formed having longer lever arms, which causes an increase of the weight at the bearing point, is thus advantageously avoidable.

According to one preferred embodiment, the asymmetrical first and second unit bearings each have a bearing axis, wherein the respective bearing axes are arranged offset in relation to one another in the vehicle vertical direction and in the vehicle longitudinal direction, starting from an arbitrary central point. It is possible due to the bearing axes offset vertically in relation to one another that the asymmetrical first and second unit bearings assume a correspondingly different vertical position on the auxiliary frame according to their respective bearing characteristic curves and the center of gravity location of the drive unit. In this way, the two asymmetrical unit bearings offer a better distributed support surface in the event of a weight displacement of the drive unit and more stability in comparison to a conventional symmetrical arrangement of the respective unit bearings.

Due to the bearing axes offset horizontally and vertically in relation to one another, it is possible that both the asymmetrical first unit bearing and also second unit bearing are positioned close to the given rigid attachment structures of the drive unit. In particular the direct proximity of the second unit bearing to the respective attachment point on the motor housing of the drive unit enables a rigid attachment of the drive unit without interconnection of a material-intensive unit support, which results in a significant weight increase.

The crossbeam preferably has a first bearing receptacle and a second bearing receptacle for the respective accommodation of the asymmetrical first and second unit bearing. The crossbeam provides rigid surfaces on which the two bearing receptacles are positionable. In this way, the respective unit bearings are insertable as rigid components into the bearing receptacles.

The first bearing receptacle and the second bearing receptacle are preferably each arranged at the end regions of the crossbeam. The auxiliary frame has two lateral longitudinal girders, which are each connected to front and rear node elements via a front and rear crossbeam. The corner regions of the auxiliary frame have a high level of component rigidity. The bearing receptacles arranged at the component-rigid end regions of the crossbeam advantageously enable a rigid arrangement of the asymmetrical first and second unit bearings.

The drive unit is preferably supported via two rear unit bearings on a rear crossbeam and/or on the rear node elements of the auxiliary frame. The auxiliary frame is used to connect the drive unit to the vehicle body, wherein the drive unit is supported via four approximately similarly formed unit bearings, which have similar rigidities. In comparison to the unit bearings of a conventional three-point mounting, the four unit bearings each have a lower weight load, because the support surface of the drive unit is better distributed. It is thus possible to use softer unit bearings in order to enable better bearing matching with respect to vibrations and structure-borne noise introduction. A higher level of damping, which results in a higher level of comfort, is achievable by the unit mounting according to the invention.

Preferably, the rear crossbeam and/or the rear node elements of the auxiliary frame have bearing receptacles for accommodating the rear unit bearings. To increase the component rigidity, it is advantageous that the rear bearing receptacles are arranged close to the rigid corners of the auxiliary frame on the crossbeam and/or on the two node elements, which have a high level of rigidity.

In an alternative embodiment, the drive unit is supported via two front unit bearings on a front crossbeam and/or on the front node elements of the auxiliary frame. In this way, the drive unit is supported via four approximately similarly formed unit bearings having similar rigidity, which have a lower weight load in comparison to the unit bearings of a conventional three-point mounting due to the better distributed support surface of the drive unit. The unit mounting according to the invention effectuates a higher level of damping and a higher level of comfort, since it is possible to use softer unit bearings, which enable better bearing matching with respect to vibrations and structure-borne noise introduction.

The front crossbeam and/or the front node elements of the auxiliary frame preferably have bearing receptacles for accommodating the front unit bearings. To increase the component rigidity, it is provided that the front bearing receptacles are arranged close to the rigid corners of the auxiliary frame on the crossbeam and/or on the node elements, which have a high level of rigidity.

According to one embodiment, the bearing receptacles are formed in one piece with the auxiliary frame. The auxiliary frame, comprising the bearing receptacles, can be manufactured from a cast part, for example. Cost-effective mass production is thus enabled.

According to an alternative embodiment, the bearing receptacles are designed as individual parts preinstalled on the auxiliary frame. It is conceivable that the bearing receptacles are either screwed and/or welded onto the auxiliary frame. A flexible design of the arrangement of the bearing receptacles is possible in this way.

Further advantages and possible applications of the present invention result from the following description in conjunction with the exemplary embodiments illustrated in the drawings.

DETAILED DESCRIPTION

Figure 1:
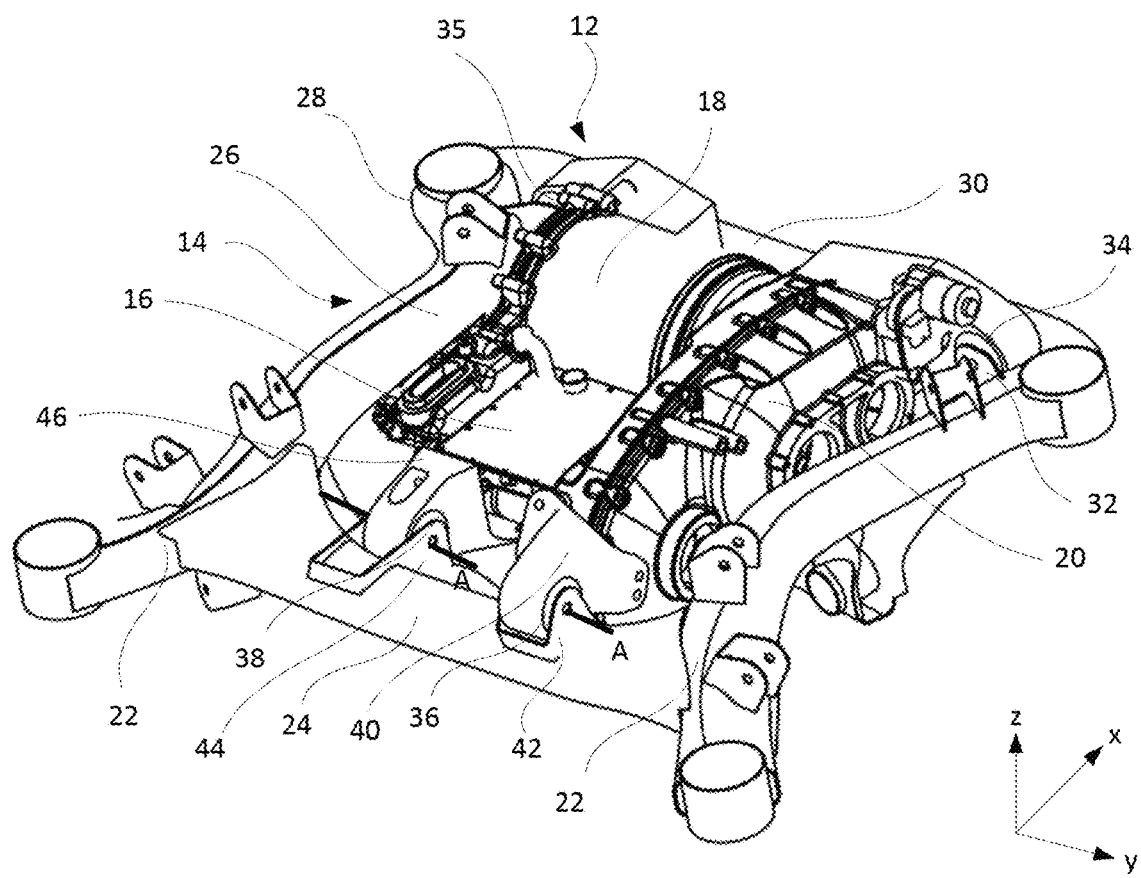
FIG. 1 shows a three-dimensional view diagonally from above of a unit mounting according to the invention of a drive unit, which is supported on an auxiliary frame.
Figure 2:
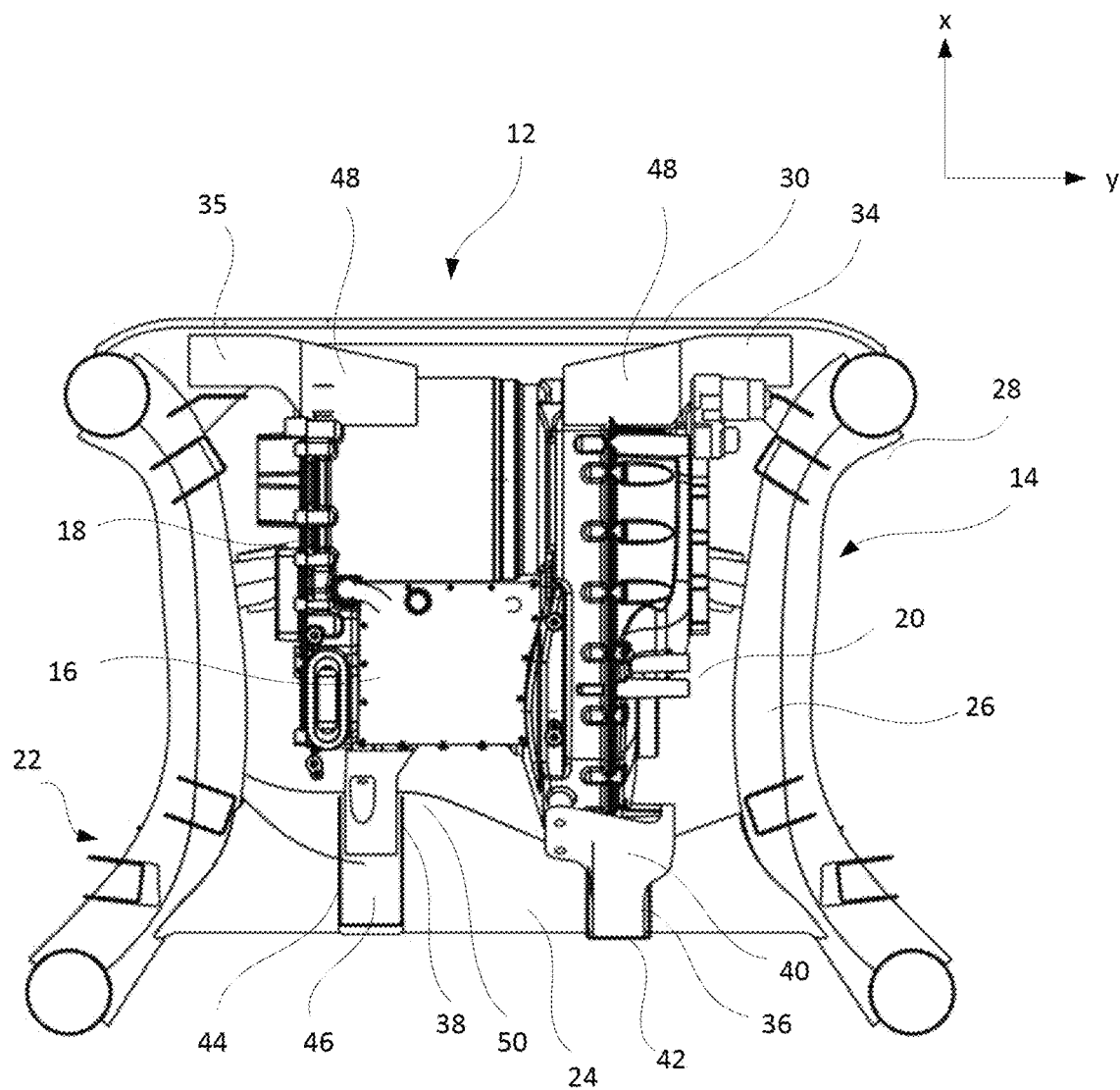
FIG. 2 shows a schematic illustration from above of a unit mounting according to the invention of a drive unit.
Figure 3:
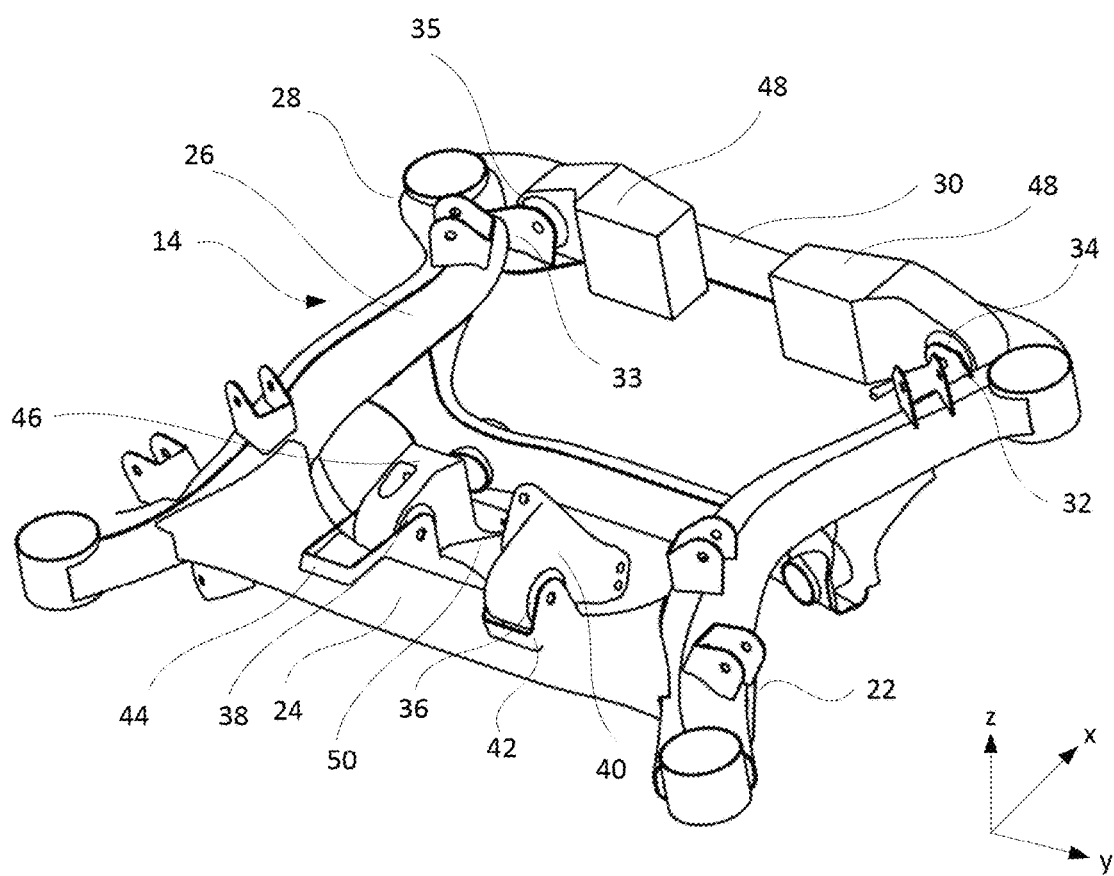
FIG. 3 shows a view of a unit mounting according to the invention illustrated with an auxiliary frame and without a drive unit.

FIG. 1 to FIG. 3 show a unit mounting, identified as a whole with the reference sign 10, for a drive unit of an electrical vehicle.

FIG. 1 shows a perspective schematic view of a unit mounting 10 according to the invention of a drive unit 12, which is mounted on an auxiliary frame 14 to form a four-point mounting. The drive unit 12, which is sketched by way of example and for easier comprehension in the present case, is designed as an electrical machine, comprising an electric motor 16, a transmission 18, and a differential 20.

The auxiliary frame 14 has two lateral node elements 22 in the vehicle longitudinal direction x in the front, which are connected to one another via a front crossbeam 24. The two front node elements 22 are extended to the rear in the vehicle longitudinal direction x via lateral longitudinal girders 26. They run together with a rear crossbeam 30 at rear node elements 28.

In the present case, a bearing receptacle 32, 33 is provided at each of the rear node elements 28 for accommodating one rear unit bearing 34, 35 in each case, wherein the two rear unit bearings 34, 35 lie approximately in one vertical plane. The drive unit 12 has two rigid attachment points on the housing of the transmission 18, which are supported in the present case via the rear unit bearings on the auxiliary frame 14.

A first unit bearing 36 and a second unit bearing 38 are provided on the front crossbeam 24. In the vehicle longitudinal direction x at the front, the differential 20 of the drive unit 12 is supported via the first unit bearing 36 with a unit support 40 interconnected. The housing of the electric motor 16, which has a greater distance to the auxiliary frame 14 than the housing of the differential 20, is supported via the second front unit bearing 38 on the auxiliary frame 14.

According to the invention, the second front unit bearing 38 is arranged asymmetrically in relation to the first unit bearing 36. In particular, the two front unit bearings 36, 38 are arranged offset in relation to one another on the auxiliary frame 14 in the vehicle vertical direction z and in the vehicle longitudinal direction y. Due to the bearing axes A offset vertically in relation to one another of the two unit bearings 36, 38, it is possible that the first unit bearing 36 and the second unit bearing 38 assume a correspondingly different vertical location on the auxiliary frame 14 according to their respective bearing characteristic curves and the center of gravity location of the drive unit 12.

In the present case, the front crossbeam 24 provides an installation surface for arranging bearing receptacles 42, 44 on its rigid end regions, in which the first unit bearing 36 and the second unit bearing 38 are each accommodated. The first bearing receptacle 42 rests in the installed state of the auxiliary frame 14 on the upwardly oriented face of the crossbeam 24, whereas the second bearing receptacle 44 is positioned on the rear side of the front crossbeam 24 in the direction of the drive unit 12, which is advantageous for installation space. In this way, the two front asymmetrical unit bearings 36, 38 offer a better distributed support surface and more stability in the event of a weight displacement of the drive unit 12 in comparison to a conventional, symmetrical arrangement of the front unit bearings 36, 38.

Due to the different vertical and horizontal arrangement of the respective bearing receptacles 42, 44 on the auxiliary frame 14, the respective bearing axes A of the asymmetrical first and second unit bearings 36, 38 used are arranged offset in relation to one another in the vehicle vertical direction z and in the vehicle longitudinal direction y. In the present case, the bearing axis A of the first unit bearing 36 is aligned flush with the extension direction of the crossbeam 24 and is arranged above the crossbeam 24 in the vehicle vertical direction z. The bearing axis A of the second unit bearing 38 is arranged nearly at the same vertical height as the crossbeam 24. In the vehicle vertical direction z, it lies essentially in the plane of the crossbeam 24.

The second bearing receptacle 44 is arranged on the crossbeam 24 favorably for installation space in such a way that the second unit bearing 38 used is positioned on the drive side close to an attachment structure of the housing of the motor 16. In this way, a weight-increasing reinforcement of the second unit bearing 38 by a material-intensive unit support 46 is avoidable.

FIG. 2 illustrates a unit mounting 10 according to the invention of a drive unit 12 on an auxiliary frame 14 from above. The auxiliary frame 14 comprises two lateral longitudinal girders 26 arranged in the vehicle longitudinal direction x, which are connected to one another in each case using a crossbeam 24, 30 at the front and rear node elements 22, 28. The symmetrical arrangement of the two rear unit bearings 34, 35 can be seen well, which are arranged spaced apart from one another on the auxiliary frame 14 in the vehicle transverse direction y. The unit supports 48 arranged above the rear unit bearings 34, 35 are each connected to an attachment point of the housing of the transmission 18.

The two front unit bearings 36, 38 are each inserted into a bearing receptacle 42, 44 on the front crossbeam 24 of the auxiliary frame 14. With a respective unit support 40, 46 interconnected, the first unit bearing 36 supports the housing of the differential 20 on the auxiliary frame 14, whereas the second unit bearing 38 is connected to the attachment point of the housing of the motor 16.

In the present case, the front crossbeam 24 is deep drawn in the direction of the drive unit 12 to form a flange 50. This enables the auxiliary frame 14 to approach the second unit bearing 38, in order to arrange it closer to the rigid attachment point of the drive unit 12. The bearing receptacle 44 of the second unit bearing 38 is supported on the deep-drawn flange 50. In the present case, the flange 50 is formed on one side on the front crossbeam 24, in order to be used with its sufficiently large surface as a local stiffening of the second unit bearing 38. In this way, a material-intensive and weight-increasing unit support 46 on the second unit bearing 38 is avoidable.

Furthermore, the auxiliary frame 14 can compensate for a weight displacement caused by the asymmetry of the front unit bearings 36, 38. This compensation of the weight displacement is achievable in a weight-neutral manner on the auxiliary frame 14, for example in that the auxiliary frame 14, as described above, has a deep-drawn flange 50 on the front crossbeam 24.

In FIG. 3, the unit mounting 10 according to the invention is shown arranged on an auxiliary frame 14 without the drive unit. The two rear unit bearings 34, 35 are arranged on the auxiliary frame 14 spaced apart from one another in the vehicle transverse direction y. In the present case, the bearing receptacles 32, 33 of the respective rear unit bearing 34, 35 are arranged on the respective rear node elements 28 of the auxiliary frame 14.

The front unit bearings 36, 38 are arranged spaced apart from one another asymmetrically on the front crossbeam 24, wherein the respective bearing axes A of the first and second unit bearings 36, 38 are arranged differently in relation to one another in the vehicle vertical direction z and in the vehicle longitudinal direction x. This enables in particular the second unit bearing 38 to be positioned as close as possible to the attachment point of the drive unit 12, in comparison to a conventional unit mounting. An increased attachment rigidity of the bearing point is ensured in this way, whereby the interconnected unit support 46 can be formed having a lesser lever arm length and therefore a lesser weight.

The invention claimed is:

1. A unit mounting for a drive unit of an electrical motor vehicle, comprising:
at least one first unit bearing and one second unit bearing which are arranged spaced apart from one another in the vehicle transverse direction on an auxiliary frame, wherein the unit bearings each support the drive unit via a unit support and the first unit bearing and the second unit bearing are arranged asymmetrically in relation to one another on a crossbeam of the auxiliary frame by having the second unit bearing positioned at a minimum distance from an attachment point of the drive unit.

2. The unit mounting as claimed in claim 1, wherein the asymmetrical first and second unit bearings are arranged in the vehicle longitudinal direction on the front crossbeam of the auxiliary frame.

3. The unit mounting as claimed in claim 2, wherein the asymmetrical first and second unit bearings each have a bearing axis, wherein the respective bearing axes are arranged offset in relation to one another in the vehicle vertical direction and in the vehicle longitudinal direction, starting from an arbitrary central point.

4. The unit mounting as claimed in claim 3, wherein the crossbeam has a first bearing receptacle and a second bearing receptacle for the respective accommodation of the asymmetrical first unit bearing and second unit bearing.

5. The unit mounting as claimed in claim 3, wherein the drive unit is supported via two rear unit bearings on the rear crossbeam and/or on rear node elements of the auxiliary frame.

6. The unit mounting as claimed in claim 3, wherein the drive unit is supported via two front unit bearings on a front crossbeam and/or on front node elements of the auxiliary frame.

7. The unit mounting as claimed in claim 2, wherein the drive unit is supported via two rear unit bearings on the rear crossbeam and/or on rear node elements of the auxiliary frame.

8. The unit mounting as claimed in claim 7, wherein the rear crossbeam and/or the rear node elements of the auxiliary frame have bearing receptacles for the respective accommodation of the rear unit bearings.

9. The unit mounting as claimed in claim 7, wherein the crossbeam has a first bearing receptacle and a second bearing receptacle for the respective accommodation of the asymmetrical first unit bearing and second unit bearing.

10. The unit mounting as claimed in claim 1, wherein the asymmetrical first and second unit bearings are arranged in the vehicle longitudinal direction on the rear crossbeam of the auxiliary frame.

11. The unit mounting as claimed in claim 10, wherein the drive unit is supported via two front unit bearings on a front crossbeam and/or on front node elements of the auxiliary frame.

12. The unit mounting as claimed in claim 11, wherein the front crossbeam and/or the front node elements of the auxiliary frame have bearing receptacles for accommodating the front unit bearings.

13. The unit mounting as claimed in claim 10, wherein the asymmetrical first and second unit bearings each have a bearing axis, wherein the respective bearing axes are arranged offset in relation to one another in the vehicle vertical direction and in the vehicle longitudinal direction, starting from an arbitrary central point.

14. The unit mounting as claimed in claim 10, wherein the crossbeam has a first bearing receptacle and a second bearing receptacle for the respective accommodation of the asymmetrical first unit bearing and second unit bearing.

15. The unit mounting as claimed in claim 1, wherein the crossbeam has a first bearing receptacle and a second bearing receptacle for the respective accommodation of the asymmetrical first unit bearing and second unit bearing.

16. The unit mounting as claimed in claim 15, wherein the first bearing receptacle and the second bearing receptacle are each arranged on the end regions of the crossbeam.

17. The unit mounting as claimed in claim 16, wherein the drive unit is supported via two rear unit bearings on the rear crossbeam and/or on rear node elements of the auxiliary frame.

18. The unit mounting as claimed in claim 15, wherein the bearing receptacles are formed in one piece with the auxiliary frame.

19. The unit mounting as claimed in claim 15, wherein the bearing receptacles are formed as individual parts preinstalled on the auxiliary frame.

20. The unit mounting as claimed in claim 15, wherein the drive unit is supported via two rear unit bearings on the rear crossbeam and/or on rear node elements of the auxiliary frame.

* * * * *